United States Patent
Borate et al.

(10) Patent No.: US 11,720,557 B2
(45) Date of Patent: Aug. 8, 2023

(54) SYSTEM AND METHOD FOR ON-DEMAND SEARCH OF A LARGE DATASET

(71) Applicant: Druva Inc., Sunnyvale, CA (US)

(72) Inventors: Milind Vithal Borate, Pune (IN); Prahlad Nishal, Pune (IN); Vinay Punera, Pune (IN)

(73) Assignee: Druva Inc., Sunnyvale, CA (US)

( * ) Notice: Subject to any disclaimer, the term of this patent is extended or adjusted under 35 U.S.C. 154(b) by 0 days.

(21) Appl. No.: 17/403,869

(22) Filed: Aug. 16, 2021

(65) Prior Publication Data

US 2022/0327116 A1    Oct. 13, 2022

(30) Foreign Application Priority Data

Apr. 7, 2021    (IN) .............................. 202141016267

(51) Int. Cl.
*G06F 16/245* (2019.01)
*G06F 16/248* (2019.01)
*G06F 16/22* (2019.01)

(52) U.S. Cl.
CPC ........ *G06F 16/245* (2019.01); *G06F 16/2255* (2019.01); *G06F 16/248* (2019.01)

(58) Field of Classification Search
CPC ... G06F 16/245; G06F 16/2255; G06F 16/248
See application file for complete search history.

(56) References Cited

U.S. PATENT DOCUMENTS

| | | | |
|---|---|---|---|
| 9,836,492 B1* | 12/2017 | Hermanson | G06F 16/2255 |
| 2008/0306927 A1* | 12/2008 | Hoernkvist | G06F 16/907 |
| 2011/0314095 A1* | 12/2011 | Gupta | H04N 21/44012 |
| | | | 709/203 |
| 2016/0063021 A1* | 3/2016 | Morgan | G06F 16/182 |
| | | | 707/754 |
| 2016/0378824 A1* | 12/2016 | Li | G06F 16/24532 |
| | | | 707/715 |
| 2019/0340274 A1* | 11/2019 | Keller | G06F 16/2282 |
| 2020/0349163 A1* | 11/2020 | Nadeau | G06F 16/182 |
| 2021/0224225 A1* | 7/2021 | Gao | G06F 16/148 |
| 2021/0286806 A1* | 9/2021 | Ahmadi | G06F 16/245 |
| 2021/0357377 A1* | 11/2021 | Stephens | G06F 16/24556 |

* cited by examiner

*Primary Examiner* — Alicia M Willoughby
(74) *Attorney, Agent, or Firm* — IceMiller LLP

(57) ABSTRACT

A system and a method for on-demand search of a large data-set is presented. The system includes a data indexer, an index writer, and an index reader. The data indexer is configured to index the data set. The index writer is configured to create a multi-level directory including a plurality of directories having one or more hash partitions. The index writer is further configured to generate a hash table for each directory and write data from the indexed data set into a corresponding hash partition of a directory. The index reader is configured to identify and query a hash partition in each directory based on a search term and a corresponding hash table for the directory. The index reader is further configured to retrieve one or more relevant records, and present the one or more relevant records to a user.

17 Claims, 7 Drawing Sheets

SYSTEM AND METHOD FOR ON-DEMAND SEARCH OF A LARGE DATASET

CROSS REFERENCE TO RELATED APPLICATION

This application claims a benefit of, and priority to, India Patent Application No. 202141016267, filed Apr. 7, 2021, the contents of which is incorporated by reference in its entirety.

BACKGROUND

Embodiments of the present invention generally relate to systems and methods for on-demand search of a large dataset, and more particularly to systems and methods for on-demand search of a large dataset using multi-level hash tables.

Conventional full-text search engines offer a number of features such as scalability, robustness, and low response times. However, these search engines have associated costs such as always running compute and costly storage solutions (e.g., cluster-based solutions). As the size of the search data increases, the cluster size has to be also increased to maintain the necessary performance and availability using replication. For use cases where the frequency of searches is sporadic, these large clusters remain idle while incurring costs.

Other solutions involve migrating the less frequently accessed data to an object store or taking snapshots of clusters. However, solutions involving migration of data still require a fixed amount of compute and the data needs to be migrated back when needed. Further, only read-only data can be migrated to the object store and thus the migrated data cannot be updated. Similarly, solutions involving snapshots do not provide any control of the data and are complex to implement for large clusters.

Thus, there is a need for systems and methods that provide for on-demand searching of large amounts of data (>1 TB) with low response times.

SUMMARY

The following summary is illustrative only and is not intended to be in any way limiting. In addition to the illustrative aspects, example embodiments, and features described, further aspects, example embodiments, and features will become apparent by reference to the drawings and the following detailed description.

Briefly, according to an example embodiment, a system for on-demand search of a large data-set is presented. The system includes a data indexer, an index writer, and an index reader. The data indexer is configured to index the data set based on a plurality of index keys and one or more index value attributes. The index writer is configured to create a multi-level directory including a plurality of directories, wherein each directory includes one or more hash partitions. The index writer is further configured to generate a hash table for each directory of the plurality of directories by computing a hash value for each index key of the plurality of index keys based on a hash function and the number of hash partitions in each directory. The index writer is furthermore configured to write data from the indexed data set into a corresponding hash partition of a directory of the plurality of directories based on the generated hash table for the directory. The index reader is configured to identify a hash partition in each directory of the plurality of directories to query based on a search term and a corresponding hash table for each directory. The index reader is further configured to query the identified hash partition in each directory of the plurality of directories to retrieve one or more relevant records, and present the one or more relevant records to a user.

According to another example embodiment, a system for on-demand search of a large data-set is presented. The system includes a memory storing one or more processor-executable routines, and a processor communicatively coupled to the memory. The processor is configured to index the data set based on a plurality of index keys and one or more index value attributes. The processor is further configured to create a multi-level directory including a plurality of directories, wherein each directory includes one or more hash partitions. The processor is furthermore configured to generate a hash table for each directory of the plurality of directories by computing a hash value for each index key of the plurality of index keys based on a hash function and the number of hash partitions in each directory. The processor is moreover configured to write data from the indexed data set into a corresponding hash partition of a directory of the plurality of directories based on the generated hash table for the directory. The processor is further configured to identify a hash partition in each directory of the plurality of directories to query based on a search term and a corresponding hash table for each directory. The processor is furthermore configured to query the identified hash partition in each directory of the plurality of directories to retrieve one or more relevant records, and present the one or more relevant records to a user.

According to another example embodiment, a method for on-demand search of a large data-set is presented. The method includes indexing the data set based on a plurality of index keys and one or more index value attributes. The method further includes creating a multi-level directory including a plurality of directories, wherein each directory includes one or more hash partitions. The method furthermore includes generating a hash table for each directory of the plurality of directories by computing a hash value for each index key of the plurality of index keys based on a hash function and the number of hash partitions in each directory. The method moreover includes writing data from the indexed data set into a corresponding hash partition of a directory of the plurality of directories based on the generated hash table for the directory. The method further includes identifying a hash partition in each directory of the plurality of directories to query based on a search term and a corresponding hash table for each directory. The method furthermore includes querying the identified hash partition in each directory of the plurality of directories to retrieve one or more relevant records, and presenting the one or more relevant records to a user.

BRIEF DESCRIPTION OF THE FIGURES

These and other features, aspects, and advantages of the example embodiments will become better understood when the following detailed description is read with reference to the accompanying drawings in which like characters represent like parts throughout the drawings, wherein.

DETAILED DESCRIPTION OF EXAMPLE EMBODIMENTS

Figure 1:
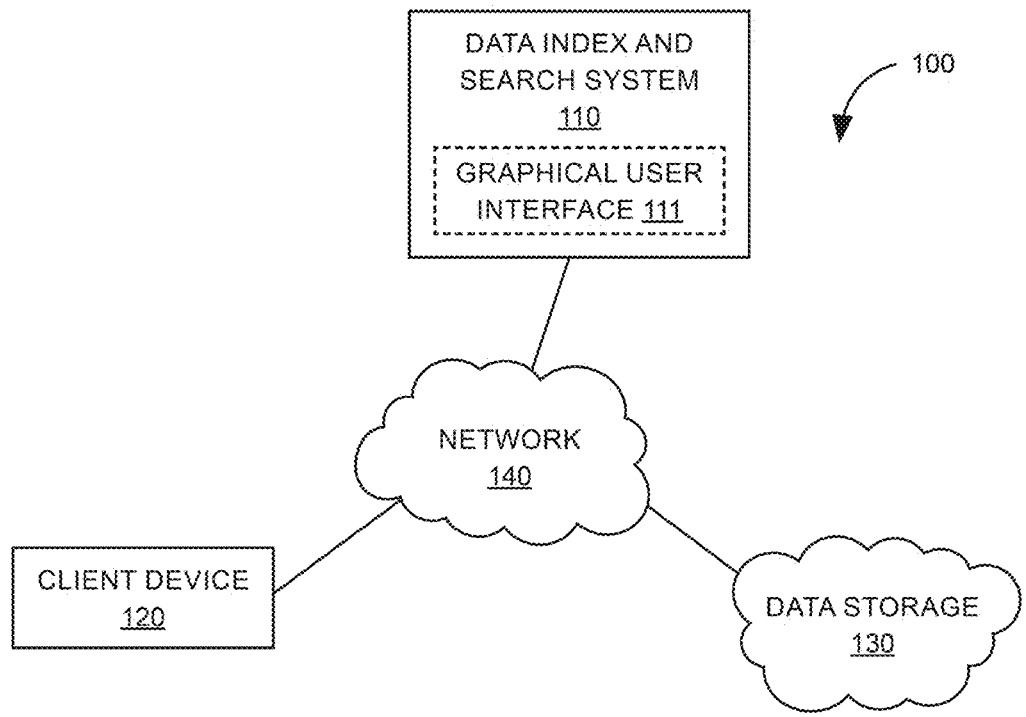
FIG. 1 is a block diagram illustrating an example data indexing and search environment, according to some aspects of the present description.

Various example embodiments will now be described more fully with reference to the accompanying drawings in which only some example embodiments are shown. Specific structural and functional details disclosed herein are merely representative for purposes of describing example embodiments. Example embodiments, however, may be embodied in many alternate forms and should not be construed as limited to only the example embodiments set forth herein. On the contrary, example embodiments are to cover all modifications, equivalents, and alternatives thereof.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Before discussing example embodiments in more detail, it is noted that some example embodiments are described as processes or methods depicted as flowcharts. Although the flowcharts describe the operations as sequential processes, many of the operations may be performed in parallel, concurrently, or simultaneously. In addition, the order of operations may be re-arranged. The processes may be terminated when their operations are completed, but may also have additional steps not included in the figures. It should also be noted that in some alternative implementations, the functions/acts/steps noted may occur out of the order noted in the figures. For example, two figures shown in succession may, in fact, be executed substantially concurrently or may sometimes be executed in the reverse order, depending upon the functionality/acts involved.

Further, although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or a section. Thus, a first element, component, region, layer, or section discussed below could be termed a second element, component, region, layer, or section without departing from the scope of example embodiments.

Spatial and functional relationships between elements (for example, between modules) are described using various terms, including "connected," "engaged," "interfaced," and "coupled." Unless explicitly described as being "direct," when a relationship between first and second elements is described in the description below, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular example embodiments only and is not intended to be limiting. Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless specifically stated otherwise, or as is apparent from the description, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

Example embodiments of the present description provide systems and methods for indexing and on-demand searching of a large data set. The term "large data set" as used herein refers to datasets with a size greater than 1 terabyte (1 TB).

FIG. 1 illustrates an example data indexing and search system environment 100 (referred to herein as system environment 100), in accordance with embodiments of the present description. The search environment 100 includes a data indexing and search system 110, one or more client devices 120, and a data storage 130. The system environment 100 may be configured to index one or more data sets from the one or more client devices 120 in the data storage 130 using the data indexing and search system 110. Examples of data in the data set to be indexed and searched include, but are not limited to, a text file, an email, a data file, or any combination thereof. The data indexing and search system 110 is configured to provide for on-demand search of a large dataset (>1 TB).

The data indexing and search system 110 may be a software or a hardware component that enables the one or more client devices 120 to store and index data and also search and access the stored data. In some embodiments, the data indexing and search system 110 is a cloud-based service. The data indexing and search system 110 may optionally further provide a graphical user interface 111 for individual clients to access data storage 130 for cloud data management. For example, a graphical user interface 111 may be a front-end cloud storage interface. Additionally, or alternatively, the data indexing and search system 110 may provide APIs for the access and management of files from the data storage 130.

The one or more client devices 120 (referred to herein as "device") may be any computing devices that have data that may need to be stored, indexed, and searched. Examples of such devices 120 include without limitation, workstations, personal computers, desktop computers, or other types of generally fixed computing systems such as mainframe computers, servers, and minicomputers. Other examples of such devices 120 include mobile or portable computing devices, such as one or more laptops, tablet computers, personal data assistants, mobile phones (such as smartphones), IoT devices, wearable electronic devices such as smartwatches, and other mobile or portable computing devices such as embedded computers, set-top boxes, vehicle-mounted devices, wearable computers, etc. Servers can include mail servers, file servers, database servers, virtual machine servers, and web servers.

In some embodiments, the system environment 100 includes a plurality of devices 120. The plurality of devices 120 may be from a single client or from different clients being serviced by the system environment 100. In some embodiments, the system environment 100 includes a single device 120 having a plurality of data sets or one large data set that needs to be stored, indexed, and searched.

In some embodiments, the data storage 130 is a cloud-based storage. The data sets from the one or more devices 120 may be stored and backed-up in an object-based storage, a file-based storage, or a block-based storage. Non-limiting examples of suitable data storage 130 include AMAZON S3, RACKSPACE CLOUD FILES, AZURE BLOB STORAGE, and GOOGLE CLOUD STORAGE. In some embodiments, the data storage 130 is an object-based storage, such as, AMAZON S3.

The various components in the system environment 100 may communicate through the network 140 and/or locally. For example, in some embodiments, one of the system components may communicate locally with the data indexing and search system 110, while other components communicate with the data indexing and search system 110 through the networks. In other embodiments, every component in the system environment 100 is online and communicates with each other through the network 140. In one embodiment, the network 140 uses standard communications technologies and/or protocols. Thus, the network 140 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 140 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc.

While the data indexing and search system 110, the client device 120, and the data storage 130, are each represented by a single block in FIG. 1, each of these components may include multiple distributed and/or independent computers (may also be referred to as workers) working cooperatively and in parallel with other computers so that the operation of the entire system will not be affected when one or more workers are down.

Figure 2:
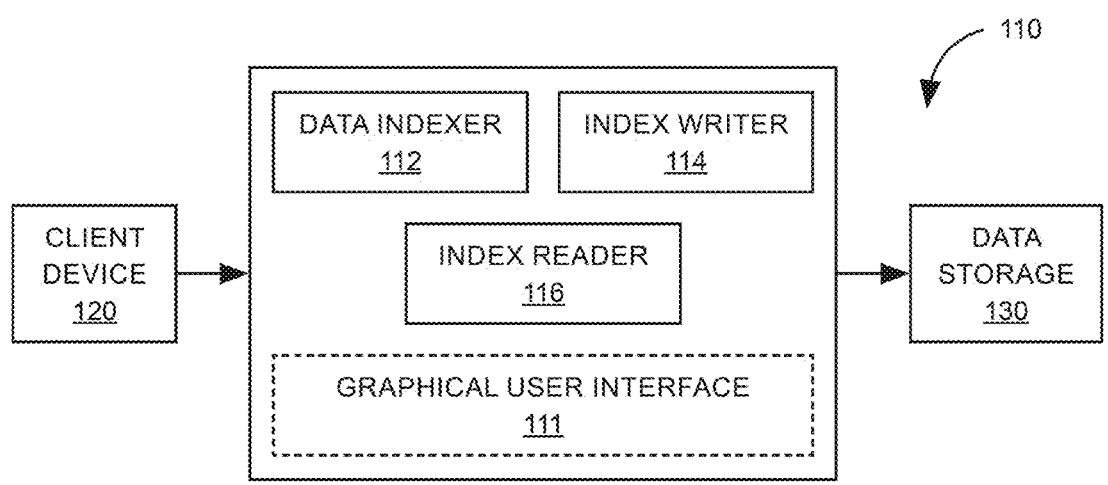
FIG. 2 is a block diagram illustrating an example data indexing and search system, according to some aspects of the present description.

FIG. 2 is a block diagram of an example data indexing and search system 110, in accordance with some embodiments of the present description. The system 110 includes a data indexer 112, as index writer 114, an index reader 116, and optionally a graphical user interface 111. Each of these components is described in detail below.

The data indexer 112 is configured to index the data set based on a plurality of index keys and one or more index value attributes. In some embodiments, the data indexer uses a document concept to index the dataset. In such instances, the data indexer 112 is configured to define a document schema that includes index attributes and stored attributes. The data indexer 112 is configured to index the data set based on a columnar file format, in some embodiments. Further, the indexed data may be sorted by index keys.

The data indexer 112 may be configured to ingest multiple documents to generate one or more index files. Further, for large amounts of data, the system 110 may include a plurality of data indexers 112 configured to ingest large amounts of data and convert them to a plurality of index files.

As noted earlier, the systems and methods of the present description provide for the on-demand search of large datasets by employing a level-based storage layout. The level-based storage layout is created using multi-level hash tables. The index-writer 114 is configured to create the level-based storage layout and write data from the indexed data set, as described hereinbelow.

The index writer 114 is configured to create a multi-level directory including a plurality of directories. The term "multi-level directory" as used herein refers to a storage layout including a plurality of directories wherein each directory of the plurality of directories has a different data limit. The levels in the multi-level directory are thus defined based on the data limit, wherein the level increases with increasing data limit.

Figure 3:
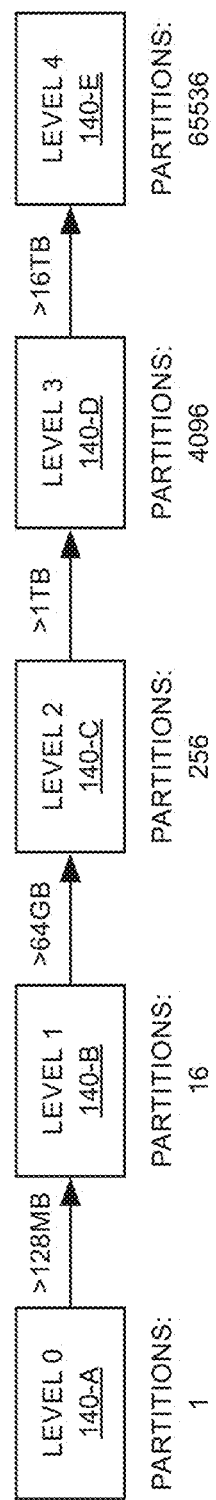
FIG. 3 is a block diagram illustrating an example multi-level directory including a plurality of directories, according to some aspects of the present description.

FIG. 3 shows an example multi-level directory including a plurality of directories 140 (140A, 140B . . . 140E). Each directory of the plurality of directories has a defined data limit which further defines the level of the directory. For example, as shown in FIG. 3, directory 140A corresponds to level 0 and has a data limit of 128 MB, directory 140B corresponds to level 1 and has a data limit of 64 GB, directory 140C corresponds to level 2 and has a data limit of 1 TB, directory 140D corresponds to level 3 and has a data limit of 16 TB, and directory 140E corresponds to level 4 and has a data limit of 256 TB. It should be noted that the number of directories and the corresponding data limit as shown in FIG. 3 are for illustration purposes only. The number of directories in the multi-level directory as well as the individual data limit for each directory may be defined by a user.

Each directory of the multi-level directory 140 further includes one or more hash partitions. The number of hash partitions in each directory is fixed. In some embodiments, the number of hash partitions in a directory may be determined based on the data size limit of the directory. The number of hash partitions in each directory may be further defined by a user. In the example embodiment shown in FIG. 3, directory 140A includes 1 hash partition, directory 140B includes 16 hash partitions, directory 140C includes 256 hash partitions, directory 140D includes 4096 hash partitions, and directory 140E includes 65536 hash partitions.

The index writer 114 is configured to create a multi-level directory including a plurality of directories, and corresponding hash partition for each directory of the plurality of directories based on a hash table.

The index writer 114 is configured to generate a hash table for each directory of the plurality of directories. The index writer 114 is configured to generate a hash table corresponding to each directory by computing a hash value for each index key of the plurality of index keys based on a hash function and the number of hash partitions in each directory. Any suitable hash function may be used to generate the hash table. In some embodiments, the hash table is generated using a hash function such as md5.

The partition key may be determined using the formula 1:

Partition Key=Hash function(Index Key)%Partition Count. (1)

The individual data size limit of each hash partition in a directory of the plurality of directories may be the same or different. The individual data size limit of each hash partition in a directory may be determined based on a hash distribution for that directory. For instance, when a hash distribution across the hash partitions in a directory is substantially equal, the data size limit for each hash partition in that directory would be the same. However, in instances wherein a hash distribution across the hash partitions in a directory is unequal, the data size limit for at least some of the hash partitions in that directory would be different.

As the data is ingested into the system, the index writer 114 is configured to write data from the indexed data set into a corresponding hash partition of a directory of the plurality of directories based on the generated hash table for that directory. The index writer 114 is configured to continue writing data into a particular directory until a data size limit of that directory is reached.

The index writer 114 is further configured to move the data to a subsequent directory with the next level of data size limit when a data size limit of a current directory is exceeded. Thus, by way of example, the index writer 114 is configured to first write the data in level 0 (directory 140A) of the multi-level directory and once the data size exceeds 128 MB, the index writer 114 is configured to move the data to level 1 (directory 140B), and so on.

The index writer 114 is configured to move the data to the subsequent directory by generating a hash table for the subsequent directory by computing a hash value for each index key of the plurality of index keys based on a hash function and the number of hash partitions in the subsequent directory. Thus, the dataset is repartitioned based on the generated hash table for the subsequent directory. For example, when the data size limit of level 1, directory 140B (64 GB) is exceeded, the index writer 114 is configured to generate a hash table for level 2, directory 140C based on a hash function and the number of partitions in the level 2, which is 256 according to the example shown in FIG. 3. Further, the index writer is configured to write data for level 2 based on the generated hash table.

The index writer 114 is further configured to write data from the current directory into a corresponding hash partition of the subsequent directory based on the generated hash table for the subsequent directory. Referring again to the example shown in FIG. 3, the index writer 114 is configured to write data from level 1, directory 140B into a corresponding hash partition of level 2, directory 140C. Similarly, for every level of data, when it reaches a certain size data limit, the index writer 114 is configured to move the data to higher levels and their corresponding hash partitions.

The level-based storage layout and partitioning help in reducing the search space when a query is received, as described hereinbelow. Referring again to FIG. 2, the system 110 further includes an index reader 116. The index reader 116 is configured to identify a hash partition in each directory of the plurality of directories to query based on a search term and a corresponding hash table for each directory.

The index reader 116 is further configured to query the identified hash partition in each directory of the plurality of directories to retrieve one or more relevant records. In some embodiments, the index reader 116 is configured to parallelly query the identified hash partitions in each directory of the plurality of directories.

The index reader 116 is further configured to present the one or more relevant records to a user. In some embodiments, the index reader 116 is configured to present the one or more relevant records to a user in a combined format. In some embodiments, the index reader 116 is configured to present the relevant records to a user along with a relevancy score for each record.

Figure 4:
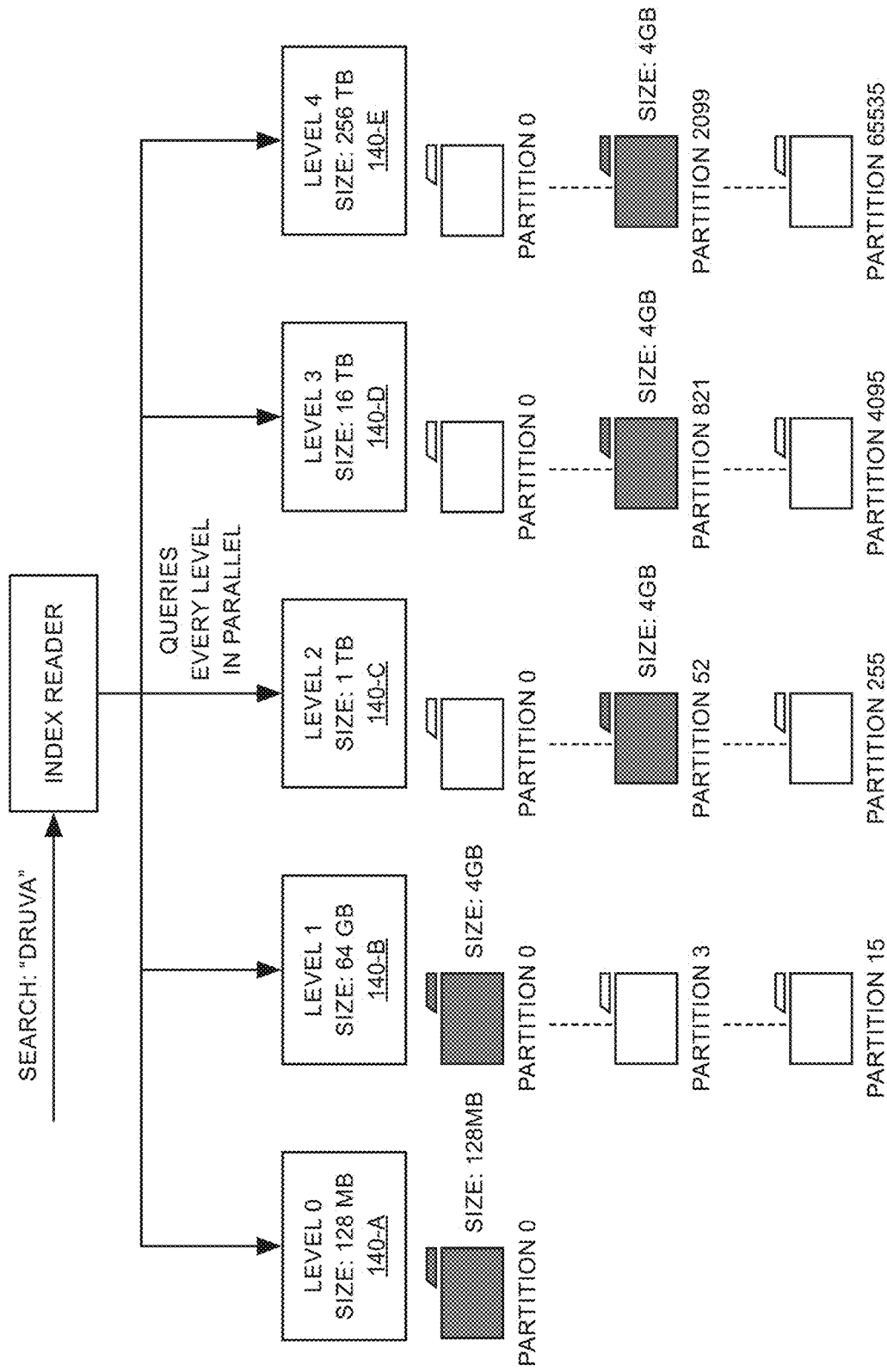
FIG. 4 is a block diagram illustrating an example of a parallel query in an identified hash partition of each directory, according to some aspects of the present description.

FIG. 4 illustrates an example embodiment wherein the system 110 receives a search request for a search term "DRUVA". The index reader 116 in such instances is configured to first identify a hash partition in each level/directory containing the indexed term "DRUVA" based on a hash table for the corresponding directory. As shown in FIG. 4, the index reader 116 has identified hash partition 0 in level 0, hash partition 0 in level 1, hash partition 52 in level 2, hash partition 821 in level 3, and hash partition 2099 in level 4, for querying.

In the example shown in FIG. 4, the index reader 116 is further configured to parallelly query the identified hash partitions to retrieve one or more relevant records corresponding to the search term "DRUVA". As shown in FIG. 4, as the index reader has to search only the identified partitions in each directory, the search space for a query is considerably reduced thus allowing for the on-demand search of a large data set. It should be noted that in FIG. 4, each hash partition in levels 1-4 (directories 140B-140E) is shown to be of equal size, i.e., 4 GB for illustration purposes only. As noted earlier, a data size limit for a hash partition would depend upon the hash distribution within a directory.

In some embodiments, the index writer 114 is configured to write the data into a directory as a data file including a footer. The footer may include details of the data stored in the directory as data chunks. In some embodiments, the index reader 116 is configured to query the identified hash partition in each directory to identify one or more relevant data files in the identified hash partition. The index reader 116 is further configured to read a footer of each data file of the one or more relevant data files to identify a valid footer. The index reader 116 is further configured to identify a relevant data chunk corresponding to the valid footer. The index reader 116 is furthermore configured to query the relevant data chunk to retrieve the one or more relevant records.

Figure 5:
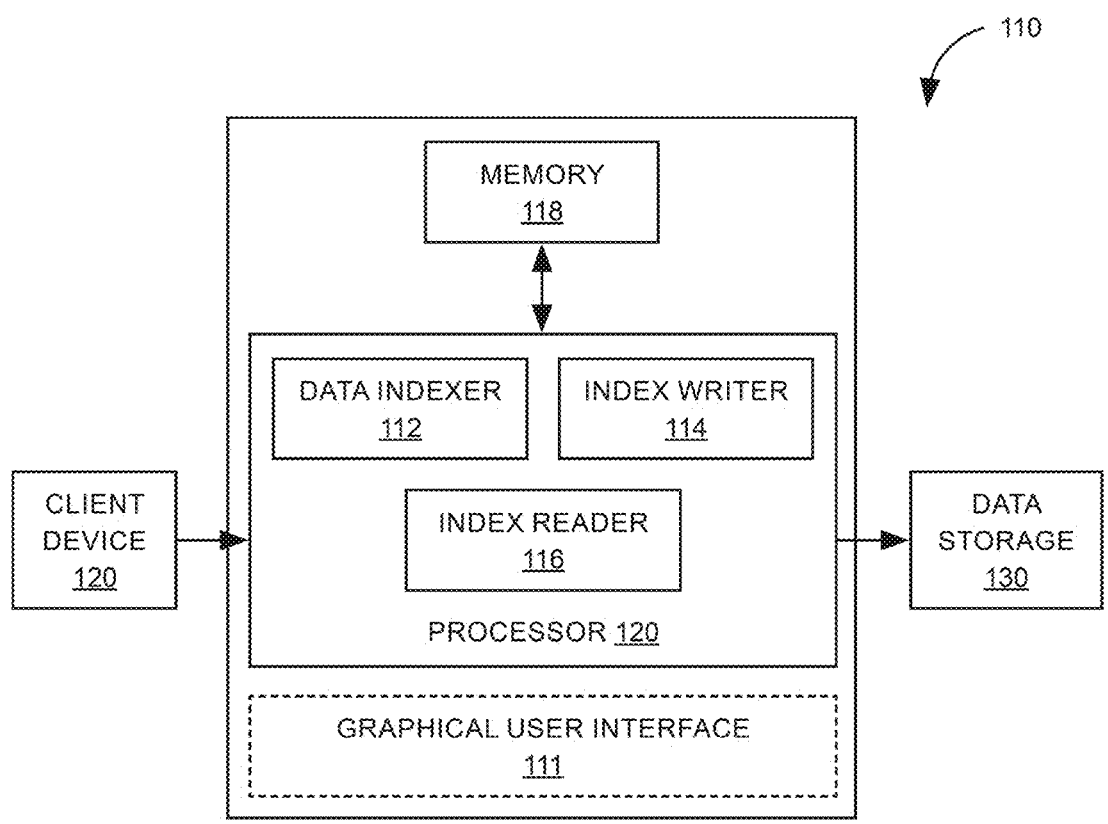
FIG. 5 is a block diagram illustrating an example data indexing and search system, according to some aspects of the present description.

Referring now to FIG. 5, a system 110 for the on-demand search of a large data set, according to some embodiments of the present description, is presented, system 110 includes a memory 118 storing one or more processor-executable routines and a processor 120 communicatively coupled to the memory 118. The processor 120 includes a data indexer 112, as index writer 114, an index reader 116. The system 110 optionally includes a graphical user interface 111. The processor 120 is configured to execute the processor-executable routines to perform the steps illustrated in the flowchart of FIG. 6.

Figure 6:
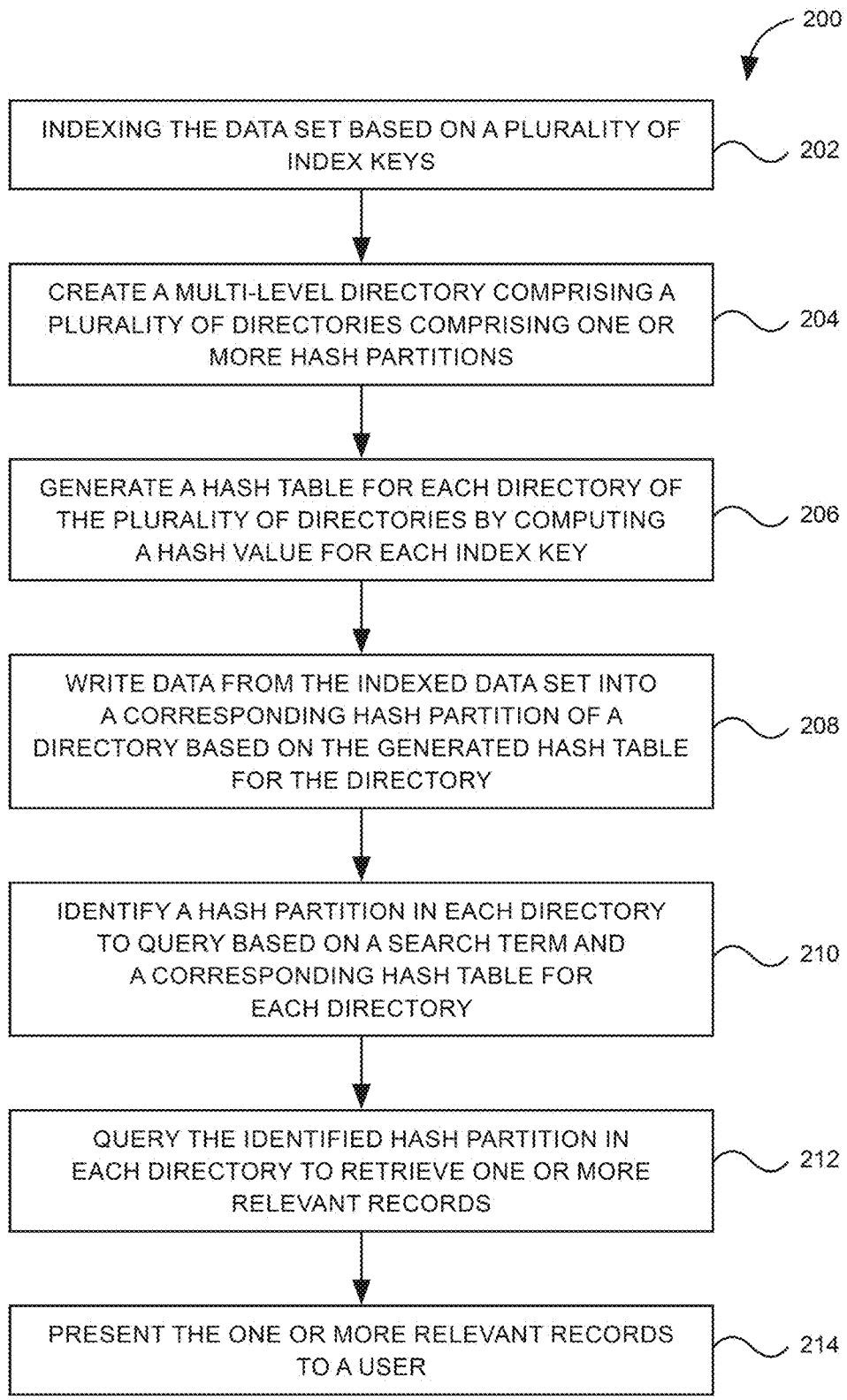
FIG. 6 is a flow chart illustrating a method for on-demand search of a large data set, according to some aspects of the present description.

FIG. 6 is a flowchart illustrating a method 200 for on-demand search of a large dataset. The method 200 may be implemented using the data indexing and search system 110 of FIGS. 1-4, according to some aspects of the present description. Each step of the method 200 is described in detail below.

The method 200 includes, at block 202, indexing the data set based on a plurality of index keys and one or more index value attributes. In some embodiments, block 202 includes indexing the data set using a document concept. In some embodiments, the data set is indexed based on a columnar file format for look-up. Further, the indexed data may be sorted by index keys.

The method 200 further includes, at block 204, creating a multi-level directory including a plurality of directories, wherein each directory includes one or more hash partitions. An example multi-level directory is shown in FIG. 3. At block 206, the method 200 includes generating a hash table for each directory of the plurality of directories by computing a hash value for each index key of the plurality of index keys based on a hash function and the number of hash partitions in each directory.

Any suitable hash function may be used to generate the hash table. In some embodiments, the hash table is generated using a hash function such as md5.

The partition key may be determined using the formula 1:

Partition Key=Hash function(Index Key)%Partition Count. (1)

The method 200 further includes, at block 208, writing data from the indexed data set into a corresponding hash partition of a directory of the plurality of directories based on the generated hash table for the directory. The method includes writing data into a particular directory until a data size limit of that directory is reached.

In some embodiments, block 208 further includes moving the data to a subsequent directory with the next level of data size limit when a data size limit of a current directory is exceeded. The step of moving the data to a subsequent directory includes generating a hash table for the subsequent directory by computing a hash value for each index key of the plurality of index keys based on a hash function and the number of hash partitions in the subsequent directory, and writing data from the current directory into a corresponding hash partition of the subsequent directory based on the generated hash table for the subsequent directory At block 210, the method further includes identifying a hash partition in each directory of the plurality of directories to query based on a search term and a corresponding hash table for each directory. The method further includes, at block 212, querying the identified hash partition in each directory of the plurality of directories to retrieve one or more relevant records. In some embodiments, block 212 includes parallelly querying the identified hash partitions in each directory of the plurality of directories. FIG. 4 shows an example of a parallel query in an identified hash partition of each directory.

Figure 7:
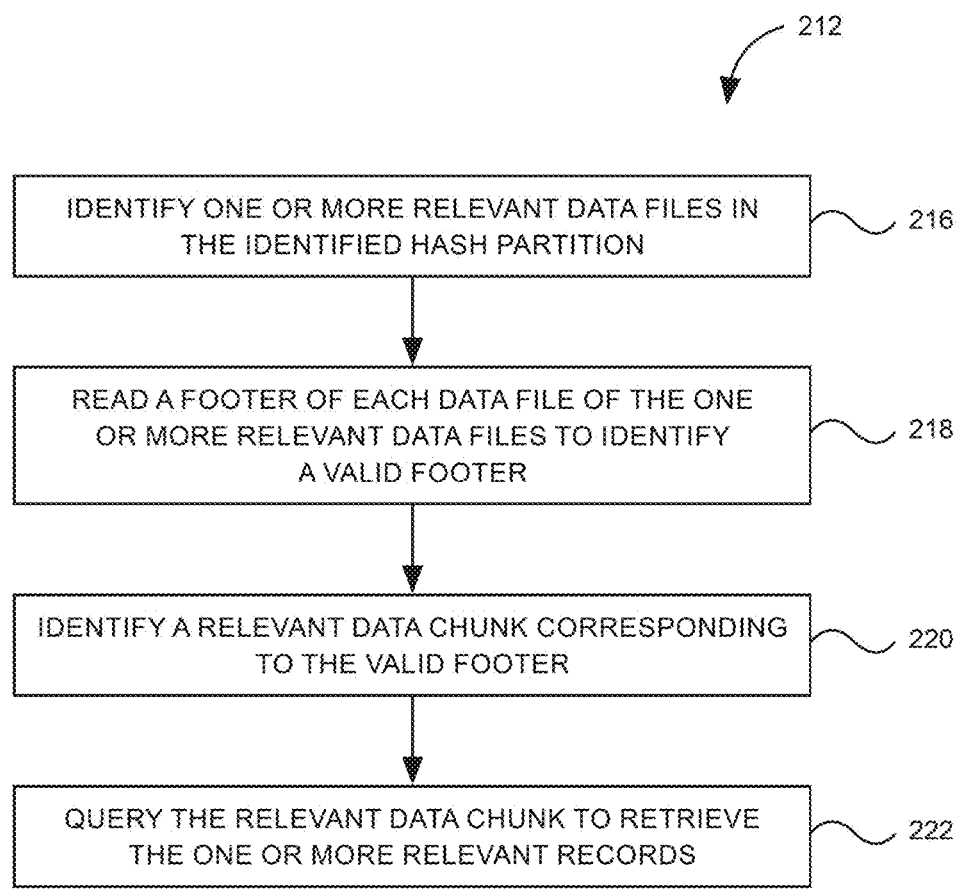
FIG. 7 is a flow chart illustrating a method step of querying the identified hash partition, according to some aspects of the present description.

In some embodiments, the method 200 includes writing the data into a directory as a data file including a footer. The footer may include details of the data stored in the directory as data chunks. Referring now to FIG. 7, in some embodiments, the step 212 (from FIG. 6) of querying the identified hash partition further includes identifying one or more relevant data files in the identified hash partition, at block 216. Step 212 (from FIG. 6) further includes reading a footer of each data file of the one or more relevant data files to identify a valid footer, at block 218. At block 220, step 212 (from FIG. 6) further includes identifying a relevant data chunk corresponding to the valid rooter. Step 212 (from FIG. 6) further includes, at block 222, querying the relevant data chunk to retrieve the one or more relevant records.

The method 200 furthermore includes, at block 214, presenting the one or more relevant records to a user. In some embodiments, block 214 includes presenting the relevant records to a user along with a relevancy score for each record.

Embodiments of the present description present solutions for use-cases where large amounts of data (>1 TB) can be indexed and searched. The search can be performed on an on-demand basis in a cost-effective manner by avoiding large clusters. Further, the on-demand search can be performed with seconds latency (e.g., 10-15 seconds). Moreover, the solutions presented here can reduce idle compute costs by minimizing the number of nodes required to remain live all the time, and also idle storage costs by using cost-effective object-based storage.

The systems and methods described herein may be partially or fully implemented by a special purpose computer system created by configuring a general-purpose computer to execute one or more particular functions embodied in computer programs. The functional blocks and flowchart elements described above serve as software specifications, which may be translated into the computer programs by the routine work of a skilled technician or programmer.

The computer programs include processor-executable instructions that are stored on at least one non-transitory computer-readable medium, such that when run on a computing device, cause the computing device to perform any one of the aforementioned methods. The medium also includes, alone or in combination with the program instructions, data files, data structures, and the like. Non-limiting examples of the non-transitory computer-readable medium include, but are not limited to, rewriteable non-volatile memory devices (including, for example, flash memory devices, erasable programmable read-only memory devices, or a mask read-only memory devices), volatile memory devices (including, for example, static random access memory devices or a dynamic random access memory devices), magnetic storage media (including, for example, an analog or digital magnetic tape or a hard disk drive), and optical storage media (including, for example, a CD, a DVD, or a Blu-ray Disc). Examples of the media with a built-in rewriteable non-volatile memory, include but are not limited to memory cards, and media with a built-in ROM, including but not limited to ROM cassettes, etc. Program instructions include both machine codes, such as produced by a compiler, and higher-level codes that may be executed by the computer using an interpreter. The described hardware devices may be configured to execute one or more software modules to perform the operations of the above-described example embodiments of the description, or vice versa.

Non-limiting examples of computing devices include a processor, a controller, an arithmetic logic unit (ALU), a digital signal processor, a microcomputer, a field programmable array (FPA), a programmable logic unit (PLU), a microprocessor, or any device which may execute instructions and respond. A central processing unit may implement an operating system (OS) or one or more software applications running on the OS. Further, the processing unit may access, store, manipulate, process and generate data in response to the execution of software. It will be understood by those skilled in the art that although a single processing unit may be illustrated for convenience of understanding, the processing unit may include a plurality of processing elements and/or a plurality of types of processing elements. For example, the central processing unit may include a plurality of processors or one processor and one controller. Also, the processing unit may have a different processing configuration, such as a parallel processor.

The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Pert, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Figure 8:
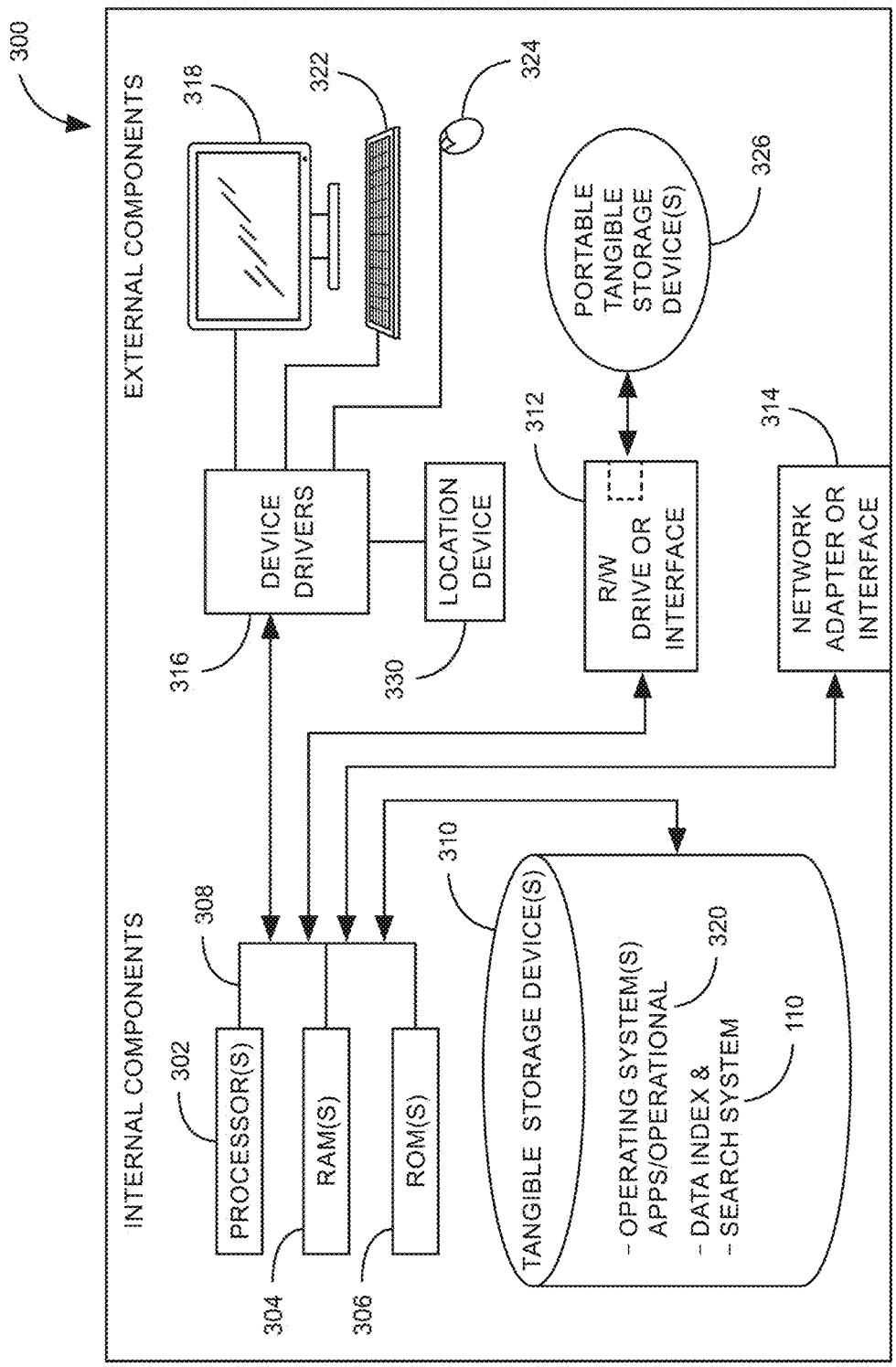
FIG. 8 is a block diagram illustrating an example computer system, according to some aspects of the present description.

One example of a computing system 300 is described below in FIG. 8. The computing system 300 includes one or more processor 302, one or more computer-readable RAMs 304 and one or more computer-readable ROMs 306 on one or more buses 308. Further, the computer system 308 includes a tangible storage device 310 that may be used to execute operating systems 320 and the data indexing and search system 110. Both, the operating system 320 and data indexing and search system 110 are executed by processor 302 via one or more respective RAMs 304 (which typically includes cache memory). The execution of the operating system 320 and/or the system 110 by the processor 302, configures the processor 302 as a special-purpose processor configured to carry out the functionalities of the operating system 320 and/or the data indexing and search system 110, as described above.

Examples of storage devices 310 include semiconductor storage devices such as ROM 506, EPROM, flash memory or any other computer-readable tangible storage device that may store a computer program and digital information.

Computer system 300 also includes a R/W drive or interface 312 to read from and write to one or more portable computer-readable tangible storage devices 326 such as a CD-ROM, DVD, memory stick or semiconductor storage device. Further, network adapters or interfaces 314 such as a TCP/IP adapter cards, wireless Wi-Fi interface cards, or 3G or 4G wireless interface cards or other wired or wireless communication links are also included in the computer system 300.

In one example embodiment, the data indexing and search system 110 may be stored in tangible storage device 310 and may be downloaded from an external computer via a network (for example, the Internet, a local area network, or another wide area network) and network adapter or interface 314.

Computer system 300 further includes device drivers 316 to interface with input and output devices. The input and output devices may include a computer display monitor 318, a keyboard 322, a keypad, a touch screen, a computer mouse 324, and/or some other suitable input device.

In this description, including the definitions mentioned earlier, the term 'module' may be replaced with the term 'circuit.' The term 'module' may refer to, be part of, or include processor hardware (shared, dedicated, or group) that executes code and memory hardware (shared, dedicated, or group) that stores code executed by the processor hardware. The term code, as used above, may include software, firmware, and/or microcode, and may refer to programs, routines, functions, classes, data structures, and/or objects.

Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above. Shared memory hardware encompasses a single memory device that stores some or all code from multiple modules. Group memory hardware encompasses a memory device that, in combination with other memory devices, stores some or all code from one or more modules.

In some embodiments, the module may include one or more interface circuits. In some examples, the interface circuits may include wired or wireless interfaces that are connected to a local area network (LAN), the Internet, a wide area network (WAN), or combinations thereof. The functionality of any given module of the present description may be distributed among multiple modules that are connected via interface circuits. For example, multiple modules may allow load balancing. In a further example, a server (also known as remote, or cloud) module may accomplish some functionality on behalf of a client module.

While only certain features of several embodiments have been illustrated and described herein, many modifications and changes will occur to those skilled in the art. It is, therefore, to be understood that the appended claims are intended to cover all such modifications and changes as fall within the scope of the invention and the appended claims.

The invention claimed is:

1. A non-transitory computer readable medium comprising instructions that, when executed, cause one or more processors to:
   index the data set based on a plurality of index keys and one or more index value attributes;
   create a plurality of directories, wherein each of the directories is at a different level and comprises a different number of hash partitions, wherein a data size limit of each directory of the plurality of directories is different, and wherein the number of hash partitions in the directory is based on the data size limit of the directory,
   generate a hash table of values for each of the directories by hashing, based on a hash function, each of the index keys and the corresponding number of hash partitions in the corresponding directory,
write data from the indexed data set into the corresponding hash partition of one of the directories based on the respectively generated hash table,
identify a hash partition in each of the directories using the corresponding hash table,
query the identified hash partitions based on a search term to retrieve one or more relevant records, and
present the one or more retrieved records to a user.

2. The system of claim 1, wherein a data size limit of each hash partition in a directory is based on a hash distribution of the hash partitions in the directory.

3. The system of claim 1, wherein the system is further configured to move the data from one of the hash partitions at the corresponding level of the corresponding directory to another of the hash partitions at another of the levels at the corresponding directory having a greater data size limit when a data size limit of the directory that comprises the one hash partition is exceeded.

4. The system of claim 3, wherein the system is further configured to move the data to the directory, having the greater data size limit, by:
generating another hash table therefor by computing a hash value for each of the of index keys based on a hash function and the number of hash partitions in that directory, having the greater data size limit, and
writing data from the current directory into another hash partition based on the other generated hash table.

5. The system of claim 1, wherein the system is further configured to index the data set based on a columnar file format.

6. The system of claim 1, wherein the system is further configured to parallelly query the identified hash partitions in each of the directories.

7. The system of claim 1, wherein the system is further configured to query the identified hash partition in each directory to:
identify one or more relevant data files in the identified hash partition;
read a footer of each data file of the one or more relevant data files to identify a valid footer;
identify a relevant data chunk corresponding to the valid footer; and
query the relevant data chunk to retrieve the one or more relevant records.

8. A system for on-demand search of a large data-set, the system comprising:
a memory storing one or more processor-executable routines; and
a processor communicatively coupled to the memory, the processor being configured to:
index the data set based on a plurality of index keys and one or more index value attributes;
create a multi-level directory comprising a plurality of directories, wherein each of the directories is at a different level and comprises a different number of hash partitions, wherein a data size limit of each directory of the plurality of directories is different, and wherein the number of hash partitions in the directory is based on the data size limit of the directory,
generate a hash table of values for each of the directories by hashing, based on a hash function, each of the index keys and the corresponding number of hash partitions in the corresponding directory,
write data from the indexed data set into the corresponding hash partition of one of the directories based on the respectively generated hash table,
identify a hash partition in each of the directories using the corresponding hash table,
query the identified hash partitions based on a search term to retrieve one or more relevant records, and
present the one or more retrieved records to a user.

9. The system of claim 8, wherein the processor is further configured to move the data from one of the hash partitions at the corresponding level of the corresponding directory to another of the hash partitions at another of the levels at the corresponding directory having a greater data size limit when a data size limit of the directory that comprises the one hash partition is exceeded.

10. The system of claim 9, wherein the processor is further configured to move the data to the directory, having the greater data size limit, by:
generating another hash table therefor by computing a hash value for each of the index keys based on a hash function and the number of hash partitions in that directory, having the greater data size limit, and
writing data from the current directory into another hash partition based on the other generated hash table.

11. The system of claim 8, wherein the processor is further configured to parallelly query the identified hash partitions in each of the directories.

12. The system of claim 8, wherein the processor is configured to query the identified hash partition to:
identify one or more relevant data files in the identified hash partition;
read a footer of each data file of the one or more relevant data files to identify a valid footer;
identify a relevant data chunk corresponding to the valid footer; and
query the relevant data chunk to retrieve the one or more relevant records.

13. A method for on-demand search of a large data-set, the method comprising:
indexing the data set based on a plurality of index keys and one or more index value attributes;
creating a multi-level directory comprising a plurality of directories, wherein each of the directories is at a different level and comprises a different number of hash partitions, wherein a data size limit of each directory of the plurality of directories is different, and wherein the number of hash partitions in the directory is based on the data size limit of the directory,
generating a hash table of values for each of the directories by hashing, based on a hash function, each of the index keys and the corresponding number of hash partitions in the corresponding directory,
writing data from the indexed data set into the corresponding hash partition of one of the directories based on the respectively generated hash table,
identifying a hash partition in each of the directories using the corresponding hash table,
querying the identified hash partitions based on a search term to retrieve one or more relevant records, and
presenting the one or more retrieved records to a user.

14. The method of claim 13, further comprising moving the data from one of the hash partitions at the corresponding level of the corresponding directory to another of the hash partitions at another of the levels at the corresponding directory having a greater data size limit when a data size limit of the directory that comprises the one hash partition is exceeded.

15. The method of claim 14, wherein the moving of the data to the directory, having the greater data size limit, comprises:
- generating another hash table therefor by computing a hash value for each of the index keys based on a hash function and the number of hash partitions in that directory, having the greater data size limit, and
- writing data from the current directory into another hash partition based on the other generated hash table.

16. The method of claim 13, comprising parallelly querying the identified hash partitions in each of the directories.

17. The method of claim 13, wherein the step of querying the identified hash partition comprises:
- identifying one or more relevant data files in the identified hash partition;
- reading a footer of each data file of the one or more relevant data files to identify a valid footer;
- identifying a relevant data chunk corresponding to the valid footer; and
- querying the relevant data chunk to retrieve the one or more relevant records.

* * * * *